US008856417B2

(12) United States Patent
Foster, Sr. et al.

(10) Patent No.: US 8,856,417 B2
(45) Date of Patent: Oct. 7, 2014

(54) MEMORY MODULE CONNECTOR WITH AUXILIARY POWER CABLE

(71) Applicant: International Business Machines Corporation, Armonk, NY (US)

(72) Inventors: Jimmy G. Foster, Sr., Morrisville, NC (US); Tony C. Sass, Fuquay Varina, NC (US); Paul A. Wormsbecher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 13/647,770

(22) Filed: Oct. 9, 2012

(65) Prior Publication Data

US 2014/0098480 A1    Apr. 10, 2014

(51) Int. Cl.
*H05K 7/10*   (2006.01)
*H05K 7/14*   (2006.01)
*H05K 7/18*   (2006.01)

(52) U.S. Cl.
USPC ............................ 710/301; 361/789; 361/801

(58) Field of Classification Search
CPC ............ H05K 2224/16; H05K 3/3452; H05K 2201/09781; H01R 23/68
See application file for complete search history.

(56) References Cited

U.S. PATENT DOCUMENTS

| 3,673,669 | A |   | 7/1972  | Edstrom et al. |
|-----------|---|---|---------|----------------|
| 4,008,942 | A |   | 2/1977  | Grossi         |
| 4,057,879 | A | * | 11/1977 | Eigenbrode ................... 439/358 |
| 4,818,240 | A |   | 4/1989  | Karner         |
| 4,906,197 | A | * | 3/1990  | Noll ................................. 439/79 |
| 5,013,247 | A | * | 5/1991  | Watson ............................ 439/55 |
| 5,092,781 | A | * | 3/1992  | Casciotti et al. ................ 439/62 |
| 5,383,792 | A |   | 1/1995  | Korsunsky et al. |
| 5,584,711 | A | * | 12/1996 | Arai et al. ..................... 439/326 |
| 5,632,640 | A | * | 5/1997  | Noda ............................ 439/326 |
| 5,691,882 | A |   | 11/1997 | Ma             |
| 5,730,614 | A | * | 3/1998  | Yu ................................. 439/326 |
| 5,745,426 | A |   | 4/1998  | Sekiyama       |
| 6,097,883 | A |   | 8/2000  | Dell et al.    |
| 6,135,781 | A |   | 10/2000 | Pope et al.    |
| 6,162,069 | A |   | 12/2000 | Choy           |
| 6,176,725 | B1|   | 1/2001  | Kobayashi et al. |
| 6,246,578 | B1|   | 6/2001  | Wei et al.     |
| 6,270,369 | B1|   | 8/2001  | Kato et al.    |
| 6,347,039 | B1|   | 2/2002  | Lee            |
| 6,370,036 | B1| * | 4/2002  | Boe .............................. 361/801 |
| 6,407,933 | B1|   | 6/2002  | Bolognia et al. |
| 6,414,869 | B1|   | 7/2002  | Kao et al.     |

(Continued)

FOREIGN PATENT DOCUMENTS

JP          11066246 A    3/2011
KR    10-2005-0034403    4/2005

*Primary Examiner* — Hoa C Nguyen
*Assistant Examiner* — Xanthia C Cunningham
(74) *Attorney, Agent, or Firm* — Katherine S. Brown; Jeffrey L. Streets

(57) ABSTRACT

A memory module includes persistent-storage memory chips and an auxiliary voltage connector for powering the persistent-storage memory chips. An auxiliary power cable has a first end coupled to an electronic power source on the system board and has a second end having connector that plugs in to the auxiliary voltage connector on the memory module to provide power to the persistent-storage memory chips. The auxiliary power cable also resists movement of a latch lever to require disconnecting the auxiliary power cable before ejecting the memory module.

14 Claims, 3 Drawing Sheets

(56) References Cited

U.S. PATENT DOCUMENTS

| | | | |
|---|---|---|---|
| 6,661,690 B2 * | 12/2003 | Moriarty et al. | 365/63 |
| 6,757,177 B2 * | 6/2004 | Harris et al. | 361/788 |
| 6,863,572 B1 | 3/2005 | Yi et al. | |
| 6,875,023 B1 * | 4/2005 | Brown | 439/61 |
| RE41,147 E * | 2/2010 | Pang et al. | 398/139 |
| 7,832,645 B2 | 11/2010 | Chen et al. | |
| 8,023,304 B2 | 9/2011 | Choi | |
| 8,292,647 B1 * | 10/2012 | McGrath et al. | 439/327 |
| 2002/0109975 A1 * | 8/2002 | Boe | 361/801 |
| 2002/0146207 A1 * | 10/2002 | Chu | 385/53 |
| 2005/0195577 A1 * | 9/2005 | Emberty et al. | 361/730 |
| 2007/0032117 A1 * | 2/2007 | Huang et al. | 439/327 |
| 2007/0074897 A1 * | 4/2007 | Lashley | 174/260 |
| 2007/0218709 A1 * | 9/2007 | Yang | 439/61 |
| 2009/0023332 A1 * | 1/2009 | Ringler et al. | 439/513 |
| 2009/0035978 A1 * | 2/2009 | Calhoun et al. | 439/327 |
| 2009/0083487 A1 | 3/2009 | Wardensky et al. | |
| 2010/0241799 A1 * | 9/2010 | Schuette | 711/104 |
| 2011/0299316 A1 | 12/2011 | Choi | |

* cited by examiner

MEMORY MODULE CONNECTOR WITH AUXILIARY POWER CABLE

BACKGROUND OF THE INVENTION

1. Field of the Invention

The present invention relates to memory module connectors, and more particularly to a memory module connector that provides auxiliary power to a memory module.

2. Background of the Related Art

Computer systems range from smaller, general purpose computers suitable for household and office use, to larger and more specialized computer systems. A personal computer (PC) is an example of a general-purpose computer that has a selection of hardware and peripherals suitable for an individual user. A desktop computer is a PC that is designed to be set up and used for an extended period of time at a fixed location having access to an electrical power outlet. A laptop computer has the same general capabilities of a desktop, along with features for enhanced mobility, such as lighter weight, an integrated display, and a battery pack for use at a variety of locations even where a building power outlet is unavailable. A server is another type of computer configured for serving the needs of multiple users simultaneously, which has particular utility in business environments. A larger system of interconnected servers may be consolidated in a single location for centralized system administration, and to provide access to multiple users over a network.

General purpose computers and servers both include a combination of what may be referred to as short-term memory and long-term memory. Long-term memory provides a large storage capacity of a non-volatile (i.e. persistent) type, which persists even when the system is in a powered-off state. The most common long-term memory devices include hard disk drives (HDD) with rotating magnetic disks and newer solid-state devices (SSD) that require no moving parts for storage. Short-term memory, referred to usually as "system memory," typically has much less storage capacity but also much faster access times than long-term memory. Short-term memory devices typically comprise memory modules with dynamic random access memory (DRAM) chips. DRAM chips are a transient (volatile) SSD, in that the DRAM chips have no moving parts but require constant power and a refresh rate. The relatively large capacity and persistent storage of long-term memory devices are suitable for storing software applications, data, and files indefinitely until ready for use by the computer system. When a computer system is in a powered-on state, selected software instructions and data may then be retrieved from long-term memory into short-term memory for faster, more efficient execution by a processor directly from short-term memory.

BRIEF SUMMARY OF THE INVENTION

A disclosed apparatus includes a memory module, a memory module socket, and an auxiliary power cable for providing an increased voltage to the memory module. The memory module includes a semiconductor card having horizontal upper and lower card edges, a pair of vertical card edges, and a pair of opposing card faces. One or more persistent-storage memory chips are provided on one or both card faces. An auxiliary voltage connector is provided along at least one of the vertical card edges in electrical communication with the one or more memory chips. The memory module socket receives and supports the memory module at the lower card edge. The auxiliary power cable is coupled at one end to an electronic power source on the system board. A connector at the other end plugs in to the auxiliary voltage connector on the memory module to provide power from the electronic power source to the one or more memory chips. In one embodiment, the auxiliary power cable resists movement of a latch lever when plugged in to the memory module. Removing the memory module from the socket requires disconnecting the auxiliary power cable from at least one end.

DETAILED DESCRIPTION OF THE INVENTION

A memory module is disclosed that incorporates a persistent (i.e. non-volatile) solid-state memory structure as an alternative to a conventional DIMM. The memory module may have a form factor comparable to that of a standard dual in-line memory module (DIMM) and can be used instead of a conventional DIMM as system memory. In one embodiment, the persistent storage structure may include only non-volatile storage chips, such as NAND flash memory chips. In another embodiment, the persistent storage structure may include a combination of volatile (e.g. DRAM) and non-volatile (NAND flash) memory chips. The NAND flash chips or other persistent-storage devices use a higher voltage (e.g. 3.3V) than provided by a conventional DIMM socket (e.g. 1.5V). An auxiliary power cable is used to connect an auxiliary voltage source on the system board to an auxiliary voltage connector on the memory module. The auxiliary voltage source is at a higher voltage (e.g. 12V), which can be transformed more efficiently down to 3.3V than a lower standard DIMM voltage (e.g. 1.5V) could be transformed up to 3.3V.

Additional security features are provided by interaction between the auxiliary power cable and features of the DIMM socket. In particular, a latch on the socket includes a receptacle for receiving the auxiliary power cable. When the cable is plugged in to the auxiliary voltage connector on the memory module, the cable is routed along an outer portion of the lever to interfere with movement of the lever. Ejecting the memory module requires first disconnecting the auxiliary power cable from the memory module. This avoids inadvertently ejecting the memory module while powering the memory module, to protect the memory module from damage.

Figure 1:
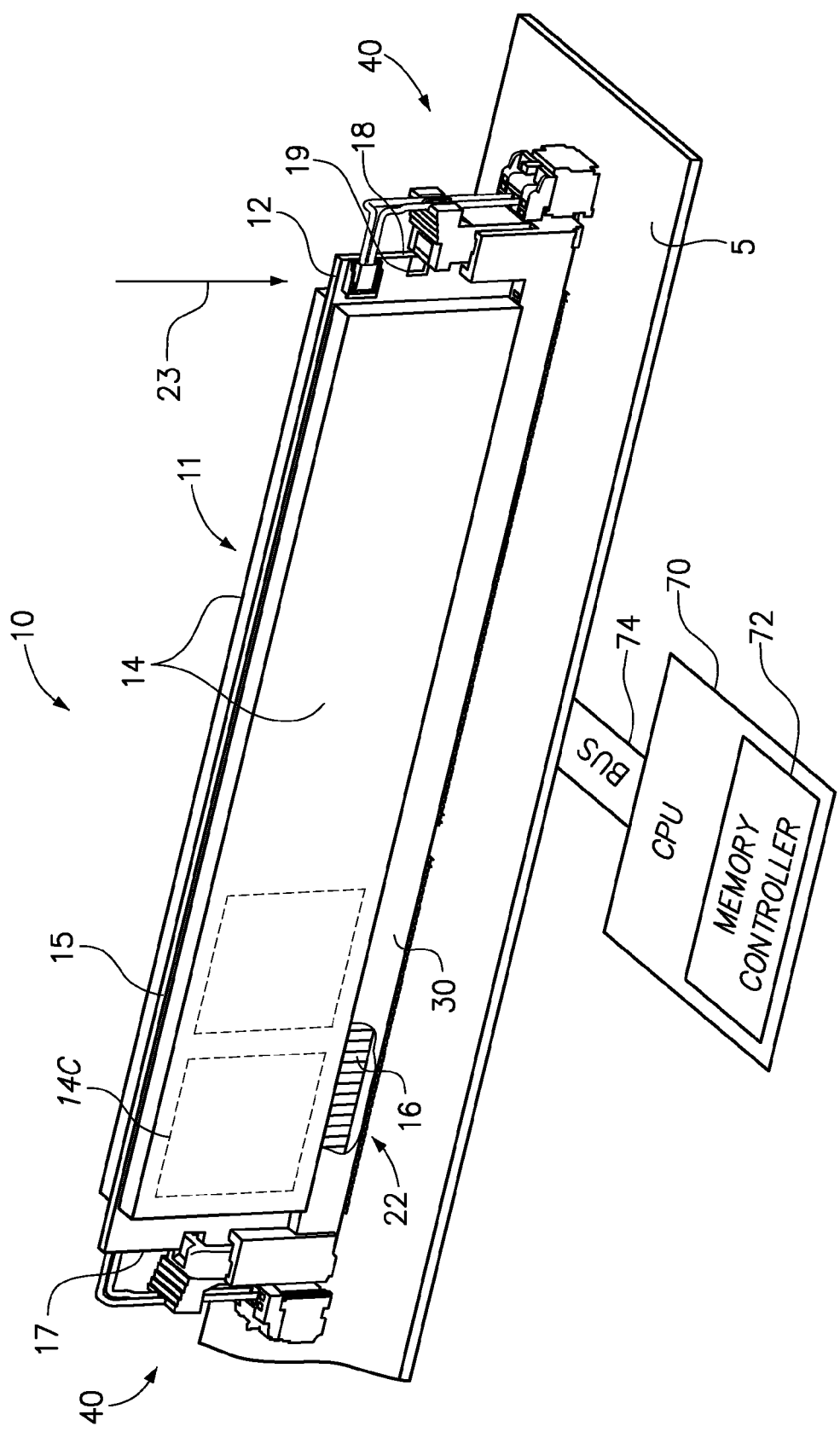
FIG. 1 is a perspective view of a memory system with a persistent, solid-state memory module inserted into a complimentary memory module socket.

FIG. 1 is a perspective view of a memory system 10 with a persistent, solid-state memory module 11 in a fully received position in a memory module socket 30. The socket 30 is an electrical memory module connector mounted on a system board 5 that receives the memory module 11 in a downward insertion direction 23. A latch 40 is provided at each end of the socket 30 for selectively securing the memory module 11 in a fully-seated position within socket 30. The memory module 11 includes a semiconductor card 12 with a persistent storage structure 14 on the opposing faces 19 of the semiconductor card 12. The semiconductor card 12 is a thin, substantially rectangular substrate, with opposing faces 19 bordered by opposing upper and lower card edges 15, 16 and opposing vertical card edges 17, 18. The persistent storage structure 14 is a non-transient, solid-state device (SSD), which may comprise NAND flash memory, for example. The persistent storage structure 14 is generically depicted as a unitary structure spanning each face 19 of semiconductor card 12, but may comprise any number of memory devices or chips 14C secured along the card face 19 as indicated using dashed lines. In one embodiment, the memory module 11 may be a Flash DIMM wherein the persistent storage structure consists entirely of persistent (non-volatile) memory chips. In another embodiment, the memory module 11 may be an NV-DIMM with a combination of both volatile and non-volatile memory chips. In an NV-DIMM, the memory stored in volatile memory chips when the computer is powered on gets backed up onto non-volatile memory chips in the event of a power loss.

A schematically-shown processor (CPU) 70 and included memory controller 72 are in communication with the socket 30 over a memory bus 74. The socket 30 provides an input/output (I/O) and power interface between the memory controller 72 and the memory module 11. A plurality of socket contacts (not shown) within the socket are aligned with corresponding card edge contacts 22 on the lower card edge 16 for carrying electronic signals between the CPU 70 and the memory module 11 so that the CPU 70 can selectively store and retrieve data on the persistent storage structure 14. The memory controller 72 may be capable of recognizing and interchangeably controlling either the disclosed memory module 11 or a conventional DIMM.

Figure 2:
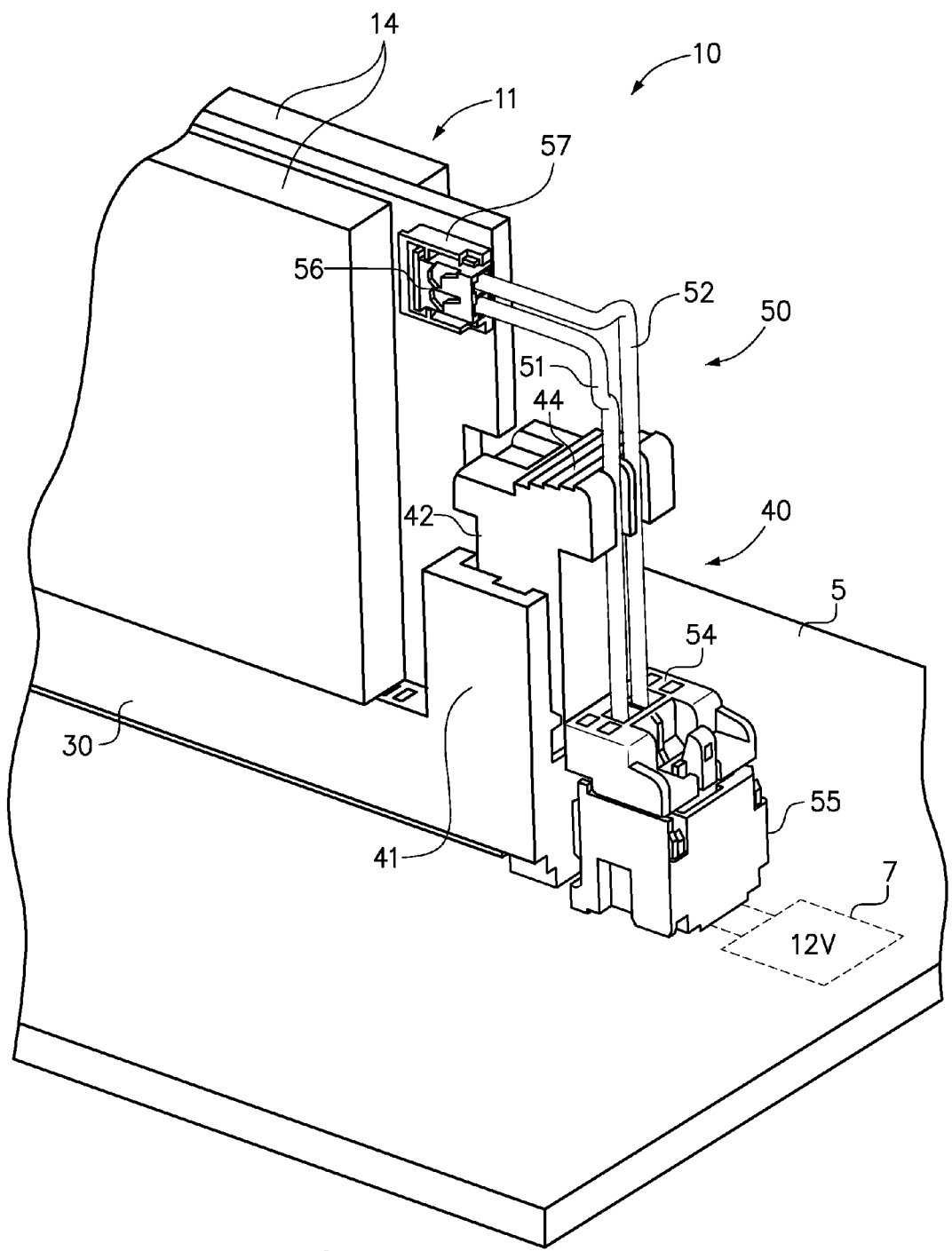
FIG. 2 is a FIG. 2 is an enlarged view of one end of the memory system 10 of FIG. 1.

FIG. 2 is an enlarged view of one end of the memory system 10 of FIG. 1. The latch 40 includes a latch tower 41 and a lever 42 that is pivotably coupled to the latch tower 41. A finger grip 44 on the lever 42 is shaped and textured for pivoting the lever 42 by hand, between an open (i.e. unlatched) position and a closed (i.e. latched) position (shown in FIG. 2). Moving the lever 42 inward to the latched position locks the memory module 11 within the socket 30, and may also urge the memory module 11 toward the fully seated position. Alternately moving the lever outward to the unlatched position unlocks the memory module 11 and may also eject the memory module 11.

The socket 30 may be configured to interchangeably receive the memory module 11 or a conventional DIMM. The socket 30 provides a standard DIMM voltage (e.g. 1.5 V) for when a conventional DIMM is received by the socket 30. The persistent storage structures 14 on the disclosed memory module 11 require a higher voltage, however, which is supplied using an auxiliary power cable 50. The cable 50 in this embodiment comprises first and second (+ and −) wires 51, 52 externally routed from the system board 5 to the memory module 11. A first connector pair 54, 55 includes a connector 54 at a first end of the cable 50 that connects to a corresponding connector 55 on the system board 5, to couple the cable 50 to a 12 V power source 7 on the system board 5. A second connector pair 56, 57 includes a connector 56 at a second end of the cable 50 that plugs into a corresponding auxiliary voltage connector 57 on the memory module 11. The power source 7 may comprise printed circuit board voltage wires or a printed circuit board power plane.

In normal use, the cable 50 may remain connected at the first end to the power source 7 (by the first connector pair 54, 55) whether the memory module 11 is present in the socket 30 or not. The second end of the cable 50 may be selectively connected or disconnected from the memory module 11 by the second connector pair 56, 57. Power at 12 V, for example, is supplied to the memory module 11 by plugging the cable 50 in to the memory module 11. The cable 50 is optionally positioned and routed to deliberately interfere with movement of the lever 42 when connected to the memory module 11. The length of the cable 50 may also be made short enough to resist or prevent the latch from being fully moved to the unlatched position while the cable 50 is plugged in, despite the flexibility of the cable 50. This intentional interference requires the cable 50 to be unplugged from the memory module 11 before ejecting the memory module 11 from the socket 30.

The wires 51, 52 of the cable 50 may be sufficiently rigid to maintain the shape shown, yet sufficiently flexible (i.e. elastically deformable) so that the wires 51, 52 return to their original shape if flexed and released. The flexibility of the wires 51, 52 facilitates connecting and disconnecting the cable 50 from the memory module 11. The use of separate wires 51, 52 enclosed in separate wire housings may contribute to the flexibility of the cable 50, as compared with having both wires 51, 52 enclosed in a single housing. To eject the memory module 11 from the socket 30, the cable 50 must first be disconnected at least from one end (typically, unplugged from the memory module 11 at the connector pair 56, 57), so that the cable 50 can then be easily flexed enough to move the latch lever 42 to the unlatched position.

In an alternative embodiment, the cable 50 may be disconnected at both ends (rather than leaving the cable 50 attached at one end) and removed entirely from the rest of the memory system 10 to facilitate subsequent removal of the memory module 11. Each connector pair 54, 55 and 56, 57 could comprise connector types that are easily disconnected by hand without special tools. The practice of removing the cable 50 from both ends before operating the lever 42 requires little to no flexing of the cable 50, allowing the cable 50 to be made more rigid. A more rigid cable can further resist movement of the lever 42 and minimize the likelihood of inadvertently ejecting the memory module 11 while the cable 50 is connected.

Figure 3:
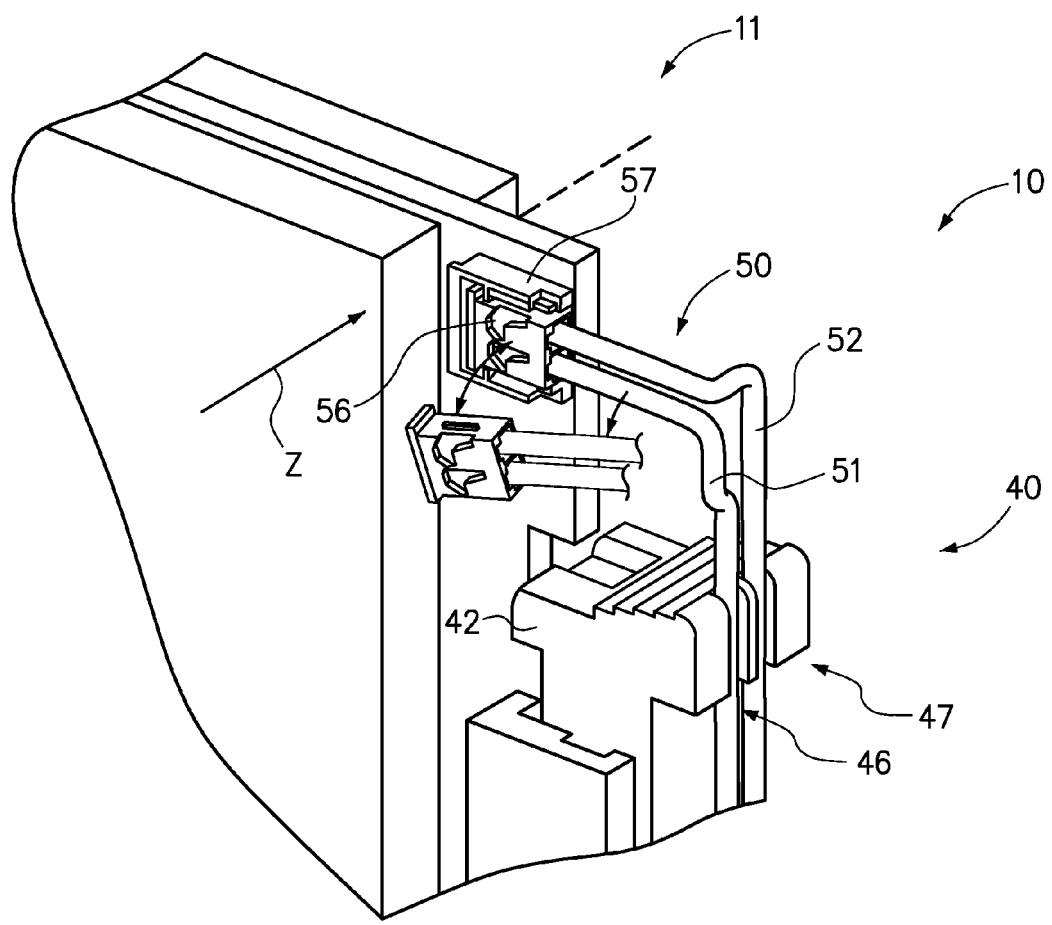
FIG. 3 is a further enlarged view of the memory system at the same end as in FIG. 2, further detailing features of the latch, cable, and memory module.

FIG. 3 is a further enlarged view of the memory system 10 at the same end as in FIG. 2, further detailing features of the latch 40, cable 50, and memory module 11. The lever 42 includes a pair of adjacent receptacles 46, 47. The receptacles 46, 47 in this embodiment comprise recesses in the lever 42, which may be formed in the lever 42 by molding. Other suitable receptacles could be used, such as intermediary fasteners configured for securing the wires 51, 52 to the lever 42. Each receptacle 46 laterally receives a respective one of the wires 51, 52. Each wire 51, 52 may have an interference fit with the respective receptacle 46, 47, so that the wires "snap into" and are thereby retained by the receptacles 46, 47. The pair of connectors 56, 57 in this embodiment are z-axis connectors that connect in a z-axis direction labeled in the figure, which is perpendicular to a plane of the memory module 11. The cable 50 may be flexed to connect and disconnect the connectors 56, 57 while the wires 51, 52 are received within the receptacles 46, 47. Because the cable 50 has two separate wires 51, 52 in the example embodiment of FIG. 3, separate receptacles are formed on the lever 42 for receiving the two wires 51, 52. In an alternative embodiment the two wires may be enclosed within a single cable housing, so that just a single receptacle on the lever 42 is needed for receiving the single-housing auxiliary power cable.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer memory system, comprising:
    a memory module including a semiconductor card having horizontal upper and lower card edges, a pair of vertical card edges, and a pair of opposing card faces, with one or more memory chips on one or both card faces and an auxiliary voltage connector in electronic communication with the one or more memory chips;
    a memory module socket on a system board for receiving and supporting the memory module at the lower card edge;
    an auxiliary power cable having a first end coupled to an electronic power source on the system board and a second end having a connector that plugs in to the auxiliary voltage connector on the memory module to provide power from the electronic power source to the one or more memory chips; and
    a latch pivotally coupled to the memory module socket and movable between a latched position and an unlatched position, the latch including a receptacle for releasably receiving the auxiliary power cable when the auxiliary power cable is plugged into the auxiliary voltage connector on the memory module.

2. The computer memory system of claim 1, wherein the auxiliary power cable is positioned to interfere with movement of the latch toward the unlatched position when the auxiliary power cable is plugged into the auxiliary voltage connector on the memory module.

3. The computer memory system of claim 2, wherein the auxiliary power cable flexes to accommodate movement of the latch between the latched and unlatched position when the auxiliary power cable is unplugged from the auxiliary voltage connector on the memory module.

4. The computer memory system of claim 2, wherein the auxiliary power cable has a length that prevents the latch from being fully moved to the unlatched position while the auxiliary power cable remains plugged into the auxiliary voltage connector on the memory module.

5. The computer memory system of claim 2, wherein the auxiliary power cable connector and the auxiliary voltage connector on the memory module are corresponding z-axis connectors that connect in a z-axis direction perpendicular to a plane of the memory module.

6. The computer memory system of claim 5, wherein the latch pivots about a pivot axis parallel with the z-axis direction.

7. The computer memory system of claim 1, wherein the cable comprises two wires enclosed in separate housings, and wherein the latch includes two receptacles, each receptacle for laterally receiving one of the two wires.

8. The computer memory system of claim 1, wherein the one or more memory chips comprise one or more persistent solid-state memory devices.

9. The computer memory system of claim 1, wherein the electronic power source supplies at least about 12V to the auxiliary power cable.

10. The computer memory system of claim 1, further comprising:
    voltage pads on the lower card edge of the memory module and electrical socket contacts that supply a voltage to the voltage pads on the lower card edge when the memory module is in a fully received position within the socket.

11. The computer memory system of claim 1, wherein the socket is configured to interchangeably receive the memory module or a standard dual in-line memory module.

12. The computer memory system of claim 11, further comprising:
    a memory controller in electronic communication with the socket and configured for interchangeably controlling the memory module or the standard dual in-line memory module.

13. The computer memory system of claim 1, wherein the memory chips include only non-volatile memory chips.

14. The computer memory system of claim 1, wherein the memory chips include a combination of volatile memory chips and non-volatile memory chips.

* * * * *